(12) United States Patent
Forman et al.

(10) Patent No.: US 10,068,365 B2
(45) Date of Patent: Sep. 4, 2018

(54) SPIRAL VISUALIZATION GENERATOR

(71) Applicant: Hewlett Packard Enterprise Development LP, Houston, TX (US)

(72) Inventors: George Forman, Port Orchard, WA (US); Olga Shain, Haifa (IL); Hila Nachlieli, Haifa (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 118 days.

(21) Appl. No.: 15/223,928

(22) Filed: Jul. 29, 2016

(65) Prior Publication Data
US 2018/0033182 A1   Feb. 1, 2018

(51) Int. Cl.
G06T 11/20    (2006.01)
G06T 13/80    (2011.01)
G06T 3/40     (2006.01)
G06F 3/048    (2013.01)

(52) U.S. Cl.
CPC .............. G06T 13/80 (2013.01); G06T 3/40 (2013.01); G06T 11/206 (2013.01); G06F 3/048 (2013.01)

(58) Field of Classification Search
None
See application file for complete search history.

(56) References Cited

U.S. PATENT DOCUMENTS

| | | | |
|---|---|---|---|
| 6,570,582 B1 | 5/2003 | Sciammarella et al. | |
| 6,819,344 B2 | 11/2004 | Robbins | |
| 7,268,791 B1 * | 9/2007 | Jannink | G06F 17/30994 345/440 |
| 8,281,244 B2 | 10/2012 | Neuman et al. | |
| 2002/0126121 A1 * | 9/2002 | Robbins | G06T 11/206 345/440 |
| 2007/0120856 A1 * | 5/2007 | De Ruyter | G06F 3/0481 345/440 |
| 2009/0169060 A1 * | 7/2009 | Faenger | G09B 29/007 382/113 |
| 2009/0322755 A1 * | 12/2009 | Holm-Peterson | G06T 11/20 345/440 |

(Continued)

OTHER PUBLICATIONS

Carlis, John V., and Joseph A. Konstan. "Interactive visualization of serial periodic data." Proceedings of the 11th annual ACM symposium on User interface software and technology. ACM, 1998.*

(Continued)

*Primary Examiner* — Ryan D McCulley

(57) ABSTRACT

Examples herein involve generating a spiral visualization of items of a dataset. Dimensions of item indicators corresponding to items of a dataset are analyzed. Starting coordinates for a spiral path for a spiral visualization of the items are determined based on the dimensions of the item indicators and a display area of a display device. A spiral path may be calculated based on the starting coordinates and the dimensions of the item indicators. The spiral visualization may be generated by rendering the item indicators on the spiral path to present a first item indicator of the item indicators from a corresponding first item of the list at the starting coordinates and a last item indicator of the item indicators of a corresponding last item on the list on the spiral path toward the center of the spiral.

19 Claims, 11 Drawing Sheets

(56) References Cited

U.S. PATENT DOCUMENTS

| | | | | |
|---|---|---|---|---|
| 2010/0194754 A1* | 8/2010 | Alsbury | ............... | G06F 3/017 |
| | | | | 345/440 |
| 2011/0261049 A1* | 10/2011 | Cardno | ............... | G06Q 10/10 |
| | | | | 345/419 |
| 2012/0116550 A1* | 5/2012 | Hoffman | ............ | A63B 24/0084 |
| | | | | 700/91 |
| 2014/0368511 A1* | 12/2014 | Baumgartner | .......... | G06T 13/00 |
| | | | | 345/473 |
| 2015/0046795 A1* | 2/2015 | Cardno | ............. | G06F 17/30554 |
| | | | | 715/243 |
| 2015/0193119 A1 | 7/2015 | Chai et al. | | |
| 2016/0253330 A1* | 9/2016 | Altshuller | ............ | G06Q 10/067 |
| | | | | 707/722 |
| 2017/0060348 A1* | 3/2017 | Kongot | ................ | G06F 3/0481 |
| 2017/0085445 A1* | 3/2017 | Layman | ................ | H04L 43/045 |
| 2017/0287180 A1* | 10/2017 | Mitra | ................... | G06T 11/206 |

OTHER PUBLICATIONS

Sawant, Amit P., Matti Vanninen, and Christopher G. Healey. "PerfViz: a visualization tool for analyzing, exploring, and comparing storage controller performance data." Visualization and Data Analysis. vol. 6495. 2007.*

"A Graphics Editor at the New York Times"; Jun. 2011; 3 pages.

Sawant, A.P. et al.; "Visualizing Multidimensional Query Results Using Animation"; Jan. 7, 2008; 12 pages.

* cited by examiner

SPIRAL VISUALIZATION GENERATOR

BACKGROUND

Visualizations enable users to quickly identify information about a data set. Visualizations may be presented on display devices and may be generated and/or displayed using a user interface, such as a graphical user interface.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
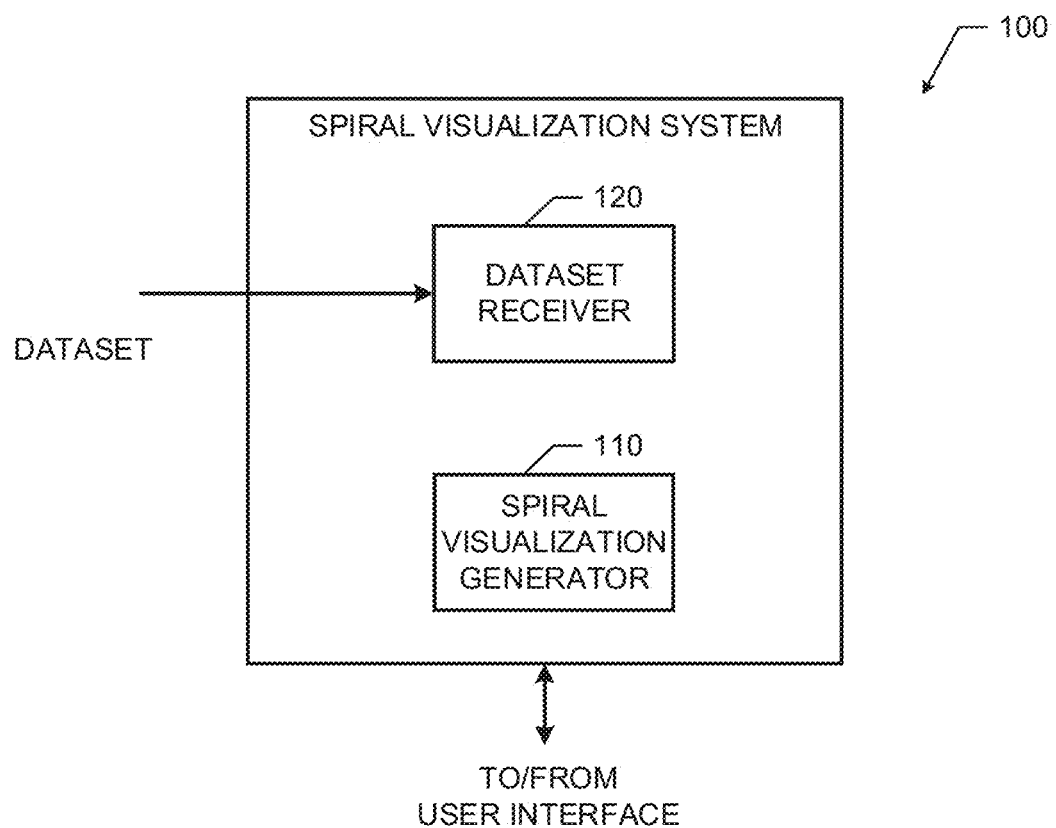
FIG. 1 illustrates a block diagram of an example spiral visualization system including a spiral visualization generator that may be implemented in accordance with an aspect of this disclosure.

Examples disclosed herein involve generating a spiral visualization for a plurality of data items. An example spiral visualization generator may receive a list of items (e.g., from a database, user input, device, etc.) and create a spiral visualization of the data set to enable a user to easily distinguish information from the data set when the spiral visualization is presented on a display device. Examples herein involve analyzing items of a data set, determining dimensions for item indicators corresponding to the items, determining dimensions of a spiral for a spiral visualization of the items, and presenting the spiral visualization to a user.

Spiral visualization may illustrate example characteristics of items to a user. However, spiral visualizations are generally manually created and/or adjusted by users that use a graphical user interface (GUI) to place item indicators of the spiral visualizations in a spiral. This can become a very tedious task for the user. In some examples, if automated, the spiral visualization may not take into account sizes of item indicators, a number of item indicators, an order of items in a list, etc. to determine a proper spiral path for the item indicators of the spiral that would not overlap one another or encroach margins of a display area. In such automated systems, the spirals may become convoluted into another shape or a basic grouping of item indicators in a visualization (e.g., similar to a bubble packing visualization). Moreover, existing systems may not effectively provide a spiral visualization of item regardless of whether they are sorted.

Examples herein provide a spiral visualization generator that automatically creates a spiral visualization from a list of items and that determines an appropriate spiral path for the spiral to enable a user to distinguish between characteristic values of the items and the items themselves. A spiral path for example spiral visualizations herein may be calculated from starting coordinates of a display and move along the spiral path toward a center point of the spiral visualization to maintain the shape of the spiral without the item indicators encroaching one another, resulting in a loss of an appearance of a spiral visualization.

An example method includes analyzing dimensions of item indicators corresponding to items of a dataset. The item indicators are generated for the items based on a characteristic of the items. Examples may further involve determining starting coordinates for a spiral path for a spiral visualization of the items based on the dimensions of the item indicators and a display area of a display device. The starting coordinates may be coordinates of the display area. A spiral path may be calculated based on the starting coordinates and the dimensions of the item indicators. Additionally or alternatively, the spiral visualization may be generated by rendering the item indicators on the spiral path to present a first item indicator of the item indicators from a corresponding first item of the list at the starting coordinates and a last item indicator of the item indicators of a corresponding last item on the list on the spiral path toward the center of the spiral.

In some examples herein, a spiral is a curve on a plane that winds or shapes around a central point at a relatively increasing or decreasing distance from that central point from one end of the spiral to the other. As used herein, the tightness (smaller distance) or looseness (greater distance) of a spiral may refer to the rate the distance from the path of the spiral decreases or increases from the center point. Accordingly, in examples herein, item indicators of spiral visualizations are presented on a spiral path (which may or may not be visualized) in that the item indicators may be presented adjacent one another on a spiral path from a starting coordinate toward a central point of the spiral. As such, the item indicators may create the appearance of a spiral. In some examples, a spiral path may spiral from a starting point toward a central point in a polygonal shape (e.g., a triangle, square, etc.) rather than along a continuous arc.

FIG. 1 is a block diagram of an example spiral visualization system 100 including an example spiral layout generator 110 that may be implemented in accordance with examples herein. The example spiral visualization system 100 includes the spiral layout generator 110 and a dataset receiver 120. In examples herein, the dataset receiver 120 receives data or a dataset and analyzes the data to identify items and corresponding characteristics the items in the dataset and the spiral layout generator 110 creates a spiral visualization of the items and/or characteristics of the items for presentation on a display device in accordance with examples herein.

The example dataset receiver 120 of FIG. 1 receives and analyzes a dataset that is to be represented in a visualization generated and/or displayed by the spiral visualization generator 110. The example dataset may be received from a database, a user input, a network device, a stream of data, etc. In examples herein, the dataset comprises a plurality of items (whether related or unrelated). Examples of items may include anything from analytical data, measurement data, sensor data, customer service data, performance data, etc. A recurring example herein may refer to customer service data as merely an example of items and characteristics of items that may be visualized using examples herein. For example, an entity, such as a product manufacturer, may receive customer service requests or complaints regarding their products. Accordingly, an example spiral visualization generated may be generated from customer service data in accordance with the examples herein may to illustrate types of customer service interactions (complaints, complements, feedback, etc.), performance of products, costs of products, pricing of products, specifications of products, etc. However, this is simply an example, and the dataset receiver 210 may receive 210 any type of data for analysis and/or visualization using the examples herein.

The example dataset receiver 120 of FIG. 1 identifies the items of the dataset that are to be presented in a spiral visualization and corresponding characteristics of the items. The items of the dataset may be provided via a list, table, data stream, matrix, index, or any other suitable data structure. Further, the example items of the dataset may include characteristics corresponding to the items. The examples characteristics may include identification information (e.g., name, identifying number, etc.), data type, key performance indicators (KPIs), etc. In some examples, the dataset receiver 120 may sort the items of the dataset based on a particular characteristic of the items in the dataset. For example, the items (such as products) may be aggregated and/or sorted based on a particular KPI (e.g., name, sales, gross profits per product, net profit per product, product performance (e.g., speed, efficiency, size, rate of complaints, etc.), etc.), or user input. Accordingly, the dataset receiver may perform preprocessing of a dataset (e.g., format analysis, item analysis, characteristic analysis, sorting, etc.) to arrange the dataset for presentation in a spiral visualization generated by the spiral visualization generator 110.

The example spiral visualization generator 110 of FIG. 1 uses characteristics of the identified items in the dataset to determine a layout for the spiral visualization in a display area of a display device regardless of whether the items in the dataset are sorted or not sorted. For example, the spiral visualization generator 110 may generate corresponding item indicators based on the characteristics of the items and use dimensions and/or characteristics of the item indicators to determine coordinates for laying out the item indicators in a spiral in a spiral visualization. In other words, the spiral visualization generator 110 may use the dimensions of the item indicators (and/or other characteristics such as color, sequence location in a list of the items, etc.) to determine dimensions of a spiral layout of the spiral visualization. As used herein, a spiral layout refers to a plot of a spiral visualization along a center path of a spiral along which the item indicators are placed in the spiral visualization of the items. In examples herein, the spiral visualization generator 110 may calculate the spiral path for the spiral visualization by determining a starting point for the spiral and relatively decreasing a distance from the spiral path to the central location for each item of the dataset until nearing the center location depending on the shape of the spiral path (an arcing spiral path or a polygonal spiral path). Further, in examples herein, the spiral visualization generator 110 may consider threshold margins between edges of the item indicators and the display area and/or one another within the spiral visualization when calculating the spiral path.

Figure 2:
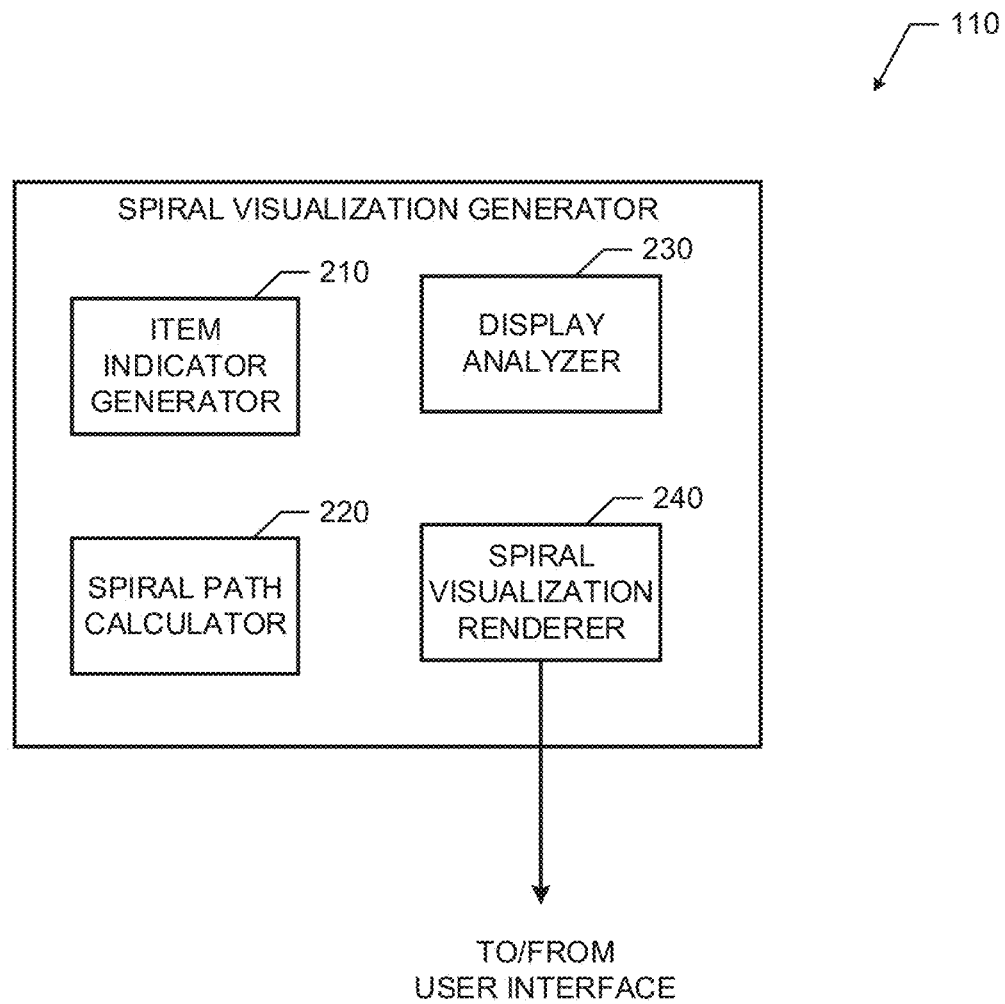
FIG. 2 is a block diagram of an example spiral visualization generator that may be used to implement the spiral visualization generator of FIG. 1.

FIG. 2 is a block diagram of an example spiral visualization generator 110 which may be used to implement the spiral visualization generator 110 of FIG. 1. The example the spiral visualization generator 110 of FIG. 2 includes an item indicator generator 210, a spiral path calculator 220, a display analyzer 230, and a spiral visualization renderer 240.

In examples herein, the item indicator generator 210 determines dimensions (e.g., shape, sizes, etc.) or characteristics (e.g., color, border type, etc.) for item indicators of items in a dataset, the spiral path calculator 220 determines starting coordinates and a spiral path for a spiral visualization of the items using the item indicators, the display analyzer 230 determines dimensions or characteristics of the spiral visualization in a display area of a display device based on the display area dimensions and the spiral path, and the spiral visualization renderer 240 renders the spiral visualization on the display device.

The example item indicator generator 210 of FIG. 2 generates item indicators for items of a dataset received by the spiral visualization generator 110. The generated item indicators are representative of the items of the dataset and corresponding characteristics of the respective items. For example, referring to the customer service data example above, items of the dataset may be products of the product manufacturer, and characteristic of the items may include name, specifications, costs, performance, gross profit per product, net profit per product, sales locations of products, complaint rate, etc. More specifically, an item indicator for a first product with a relatively large amount of sales may be larger than an item indicator for a second product with a smaller amount of sales. However, in such an example an item indicator for the first product may be smaller than an item indicator for the second product if the first product has a smaller gross profit per product than the second product. Accordingly, the item indicator generator 210 may create the item indicators based on the characteristics of the items in the dataset. Furthermore, the item indicator generator 210 may receive user input for creating the item indicators. The example user input may include settings for generating the item indicators and or requests to generate item indicators for a particular characteristic. The item indicators generated by the indicator generator 210 are then included in the spiral visualization (e.g., in a spiral path).

As mentioned above, the generated item indicators are representations of the items and/or corresponding characteristics of the items such as KPIs. For example, for an item with a large KPI, the item indicator generator 210 may create an item indicator that is relatively larger in size than another item that has a smaller KPI. Based on the information in the dataset (e.g., the number of items, the order of the items, the relative differences between particular KPIs, etc.), the item indicator generator 210 may normalize or scale features of the item indicators (e.g., size, color, shape, border color/design, etc.) for each of the items relative to one another. For example, the item indicator generator 210 may determine an average of a particular characteristic of the items in the dataset and adjust the size/color (or shade of a color) of the item indicator for each item based on the respective value of the characteristic of that particular item (e.g., relatively larger indicators represent above average and relatively smaller indicators represent below average, relatively brighter indicators represent above average and relatively dimmer indicators represent below average, etc.). In some examples, the item indicator generator 210 may use default dimensions for item indicators (e.g., a set arrangement or number of pixels, a predetermined distance or distance based on the average size of the remaining item indicators for the items of the dataset, etc.) for items having a characteristic with 0 value, or a value that is less than a threshold percentage (e.g., 5%, 1%, etc.) of the average value of the characteristic of the items. Accordingly, an item indicator may be generated for all items despite the items not having value or having a relatively small value for a given characteristic.

In some examples, for presentation of multiple characteristics of a particular item of the list in a spiral visualization, the item indicator generator 210 may create a shape that corresponds to each characteristic of the item. For example, if the item indicator generator 210 is to create an item indicator for an item that is to illustrate three characteristics, the example item indicator generator 210 may create a corresponding item indicator that has a triangular shape with the length of each edge of the triangle corresponding to the particular values of the characteristics of that item (see FIG. 6 below). Accordingly, the dimensions of the item indicator depend on the values of the three characteristic. In examples herein, in response to receiving a request for a spiral visualization of a dataset or a request for a visualization of characteristics of items of items of the dataset, the item indicator generator 210 creates corresponding item indicators for the request and for presentation in a spiral visualization.

The example spiral path calculator 220 of FIG. 2 calculates a spiral path based on the item indicators generated for characteristics of the items of the dataset. The example spiral path calculator 220 determines starting coordinates of the spiral path and calculates the spiral path from the starting coordinates toward a central point of the spiral visualization (or of a display area of a display device). In some examples, the starting coordinates may be determined using a default location (e.g., a central point of an upper-left quadrant of the display area) and adjusting from the default point to the starting coordinates based on a length of the spiral path. Accordingly, the starting coordinates may be determined based on the dimensions of the display area and/or the dimensions of the item indicators. Additionally or alternatively, the starting coordinates may be determined or moved based on user input (e.g., a mouse click at a specific location, entering the starting coordinates in a text field, etc.).

Figure 3A:
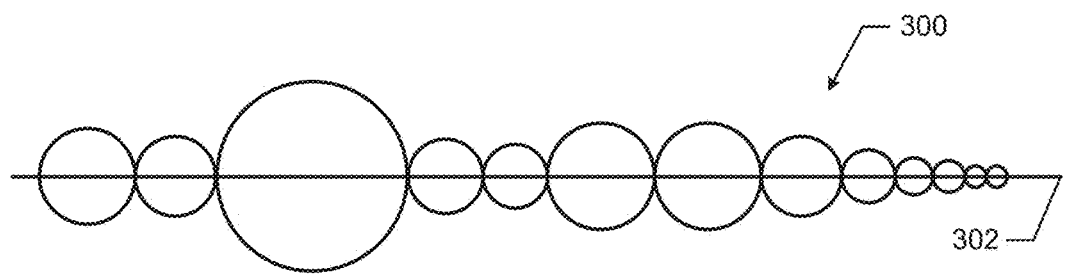
FIGS. 3A-3D graphically illustrate steps that the example spiral visualization generator of FIG. 2 may use to calculate a spiral path of an example spiral visualization.

The example spiral path calculator 220 determines dimensions of the item indicators, an order of items in the data set, and the amount of items in the data set to determine a length of the spiral path. FIGS. 3A-3D present an example visualization of calculations made by the spiral path calculator 220 to determine a spiral path for the spiral visualization. Referring to the example above, item indicators 300 of FIGS. 3A-3D may represent products and the dimensions of the item indicators 300 corresponds to a respective characteristic of the products. In FIG. 3A, the spiral path calculator 220 determines an overall length of item indicators by aligning the items indicators. In FIG. 3A, item indicators 300 are presented in a straight line 302 and adjacent one another. Although the item indicators 300 are shown tangent to one another on the straight line 302, in some examples gaps may be placed between the item indicators 300 (e.g., based on user settings or preferences) to lengthen the spiral path. Accordingly, in FIG. 3, the length of the straight line 302 depends on the dimensions (e.g., the radii) of the item indicators and the amount of the item indicators.

Figure 3B:
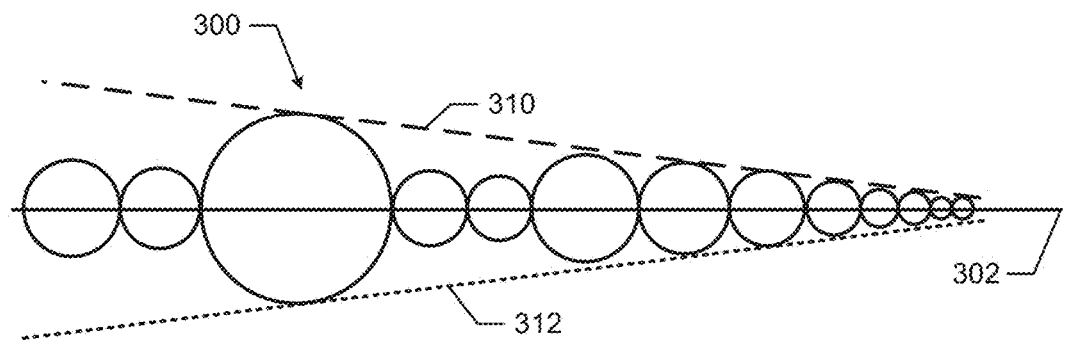

In order to determine a tightness of the spiral path, the spiral path calculator 220 may determine an outside boundary 310 and inside boundary 312 of the item indicators 300. As shown in FIG. 3B, the spiral path calculator may determine the outside boundary 310 and the inside boundary 312 by determining a line that runs tangential to outside edges (for the outside boundary 310) of the item indicators 300 in the straight line and another line that runs tangential to the inside edge (for the inside boundary) along the item indicators 300.

Figure 3C:
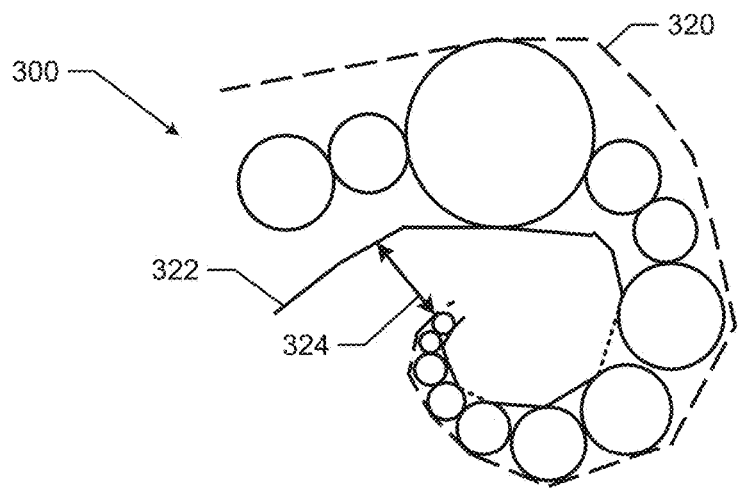

The example spiral path calculator 220 may then determine a path (e.g., an arc, a polygonal shape, etc.) of the spiral path using starting coordinates for the spiral path (e.g., a designated point on the display area, a user specified starting point, a starting point based on characteristics of the item indicators, etc.) and an outside boundary 320 (corresponding to the outside boundary 310 of FIG. 3B) and inside boundary 322 (corresponding to the inside boundary 312 of FIG. 3B) as shown in FIG. 3C. In examples herein, the spiral path calculator 220 may spiral a convex hull formed from the outside boundary 320 (which corresponds to outside boundary 310) and inside boundary 322 (which corresponds to inside boundary 312) around itself to determine the spiral path for the spiral visualization. The example tightness of the spiral for the convex hull may be calculated by keeping a threshold distance 324 between the outside boundary 320 and inside boundary 322 between each turn of the spiral. As used herein, a turn of spiral is a portion of the spiral path that rotates around the spiral path beginning and ending at a same axis of the spiral. Accordingly, using the spirals generated by the outside boundary 310 and the inside boundary 312 for the convex hull, the spiral path calculator 220 may determine the appropriate location for the spiral path of the spiral visualization between the outside 320 and inside boundary 322 (e.g., along a midpoint between the boundaries 320, 322). The example threshold distance 324 may be user specified or determined based on dimensions of the display area and or dimensions of the item indicators (e.g., the radius of the largest item indicators, smallest indicators, average radius of the item indicators, the number of item indicators, etc.). Furthermore, different threshold distances or the same threshold distances may be used between sequential turns of the spiral in the event that a spiral path of a spiral visualization includes two full turns or more. Accordingly, the spiral path calculator may calculate a convex hull from the inside and outside boundary and calculate the spiral path by spiraling the convex hull such that the threshold distance is kept between the outside boundary 320 and the inside boundary 322 between turns of the spiral visualization.

Figure 3D:
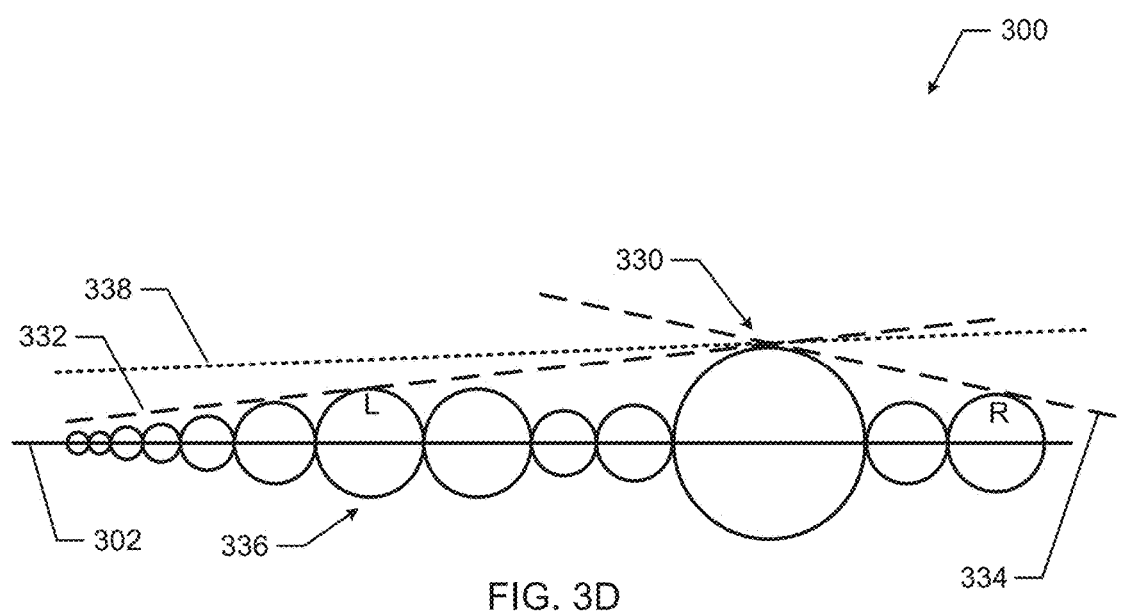

In some examples, for unsorted items of a dataset, the spiral path calculator may determine an appropriate spiral path by determining an outermost point 330 of the item indicators relative to a straight line through the item indicators as shown and slopes of hulls 332, 334 from each end item indicator of the indicators 300 as shown in FIG. 3D. In FIG. 3D, the spiral path calculator 220 determines a first hull 332 from identifying an item indicator toward a starting point of the spiral path relative to the item indicator with the outermost point 330 and calculating a tangential line from that item indicator at point L to the outermost point 330. The spiral path calculator 220 determines the second hull 334 by identifying an item indicator toward an ending point of the spiral path relative to the item indicator with the outermost point 330 and calculating a tangential line from that item indicator at point R to the outermost point 330. Finally, the spiral path calculator 220 may determine the boundaries (e.g., similar to the boundaries of FIGS. 3B, 3C) by calculating a line 338 having a slope that is between (e.g., an average) the slopes of the first and second hulls 332, 334. In some examples, when the outermost point 330 is a point of an end item indicator in the line of item indicators, the slope of the line may be set to zero (i.e., slope=0) for the "hull" calculated off the end of the line 302 as there would only be a single hull for that dataset. The example line may correspond to an inside boundary. Accordingly, the same processes described herein may be used to determine an outside boundary for the spiral path. Accordingly, the spiral path calculator 220 may determine a spiral path for unsorted items (or unsorted item indicators from items) of a dataset.

In examples herein, the spiral path calculator 220 calculating a spiral path may further involve selecting a shape for the spiral path. The example spiral paths calculated by the spiral path calculator 220 may take arc-like shapes (e.g., the spiral paths of FIG. 3C or FIGS. 4A-4E) or polygonal shapes (e.g., a triangle, square/rectangle, pentagon, hexagon, etc.). The spiral path calculator 220 may select the shape of a spiral path (e.g., arcing or polygonal) based on user input and/or based on shapes of item indicators used in the spiral visualization. In other words, a user may choose the shape of the spiral and or choose item indicator shape that would determine the shape of the spiral path. For example, a default setting may be used to select a spiral path shape based on the item indicator, such that the shape of the spiral path corresponds to the shape of the item indicators. See FIGS. 4A-4E for examples of arcing spiral paths and FIG. 5 for an example of a polygonal spiral path, specifically a triangular spiral path. Regardless of the shape of the path, the spiral path calculator 220 determines a starting point of the spiral path and calculates the spiral path to progress toward central point of the spiral path using the dimensions of the item indicators and threshold distances between boundaries of the spiral path.

Referring back to FIG. 2, the example display analyzer 230 of FIG. 2 determines whether a spiral path calculated by the spiral path calculator 220 is acceptable and falls within the margins of a display area (e.g., a window of an application, a browser, etc.) of a display device. For example, the display analyzer 230 may determine whether the spiral fits within the display area of a display device that is to present the spiral visualization. In other words, the display analyzer 230 may plot the item indicators along the calculated spiral path to ensure that the spiral visualization may effectively present the characteristics of the items to a user.

In examples herein, the display analyzer 230 may confirm that the item indicators presented along the spiral path do not overlap one another along the path to ensure that the item indicators can be distinguished from one another while approaching the center point of the spiral. In other words, the display analyzer 230 may perform a cross check of the boundaries as well as confirm that adjacent item indicators do not overlap one another when plotted on the spiral visualization. For example, due to the length of the calculated spiral path (which is based on the size of the item indicators) and the size of the display area, the shape of the spiral path may be too tight such that item indicators become overlapped. In such an example, the display analyzer 230 may provide feedback to the spiral path calculator 220 and/or the item indicator generator 210 that the spiral path is to be reshaped (e.g., lengthened/loosened) or the item indicators are to be scaled down.

Furthermore, the display analyzer 230 may determine whether a calculated spiral path is too large for the display area itself. For example, the display analyzer 230 may determine that some of the item indicators are outside a margin of the display area, there is not enough space on the spiral path toward the center point to display the item indicators on that spiral path, etc.), the item indicator generator 210 may scale down the item indicators (e.g., 10%, 20%, etc.) and the spiral path calculator 220 may recalculate the spiral path. In some examples, if the spiral visualization is too small or less than a threshold percentage of the display area (e.g., an area of the item indicators is ⅓ of the display area), then the size of the item indicators may be increased (i.e., scaled up) and the spiral path calculator 220 may recalculate the spiral path. In some examples, the display analyzer 230 may provide display dimensions of a display area of a display device to the item indicator 210 and/or the spiral path calculator 220, which may be considered when generating the item indicators for the items and/or the spiral path for the spiral visualization of the items.

Accordingly, once the display analyzer 230 determines that the item indicators 300 can suitably be displayed along an appropriate spiral path to generate the spiral visualization 240, display data for the spiral visualization may be provided to the spiral visualization renderer. For example, the item indicator generator 210, the spiral path calculator 220, and/or the display analyzer 230 may provide display data corresponding to the item indicators (e.g., colors, dimensions, sizes, etc.), the spiral path calculator 220 may provide coordinates of the spiral path, and/or the display analyzer 230 may provide coordinates of the display area to plot the item indicators to create the spiral visualization to the spiral visualization renderer 240.

The example spiral visualization renderer 240 of FIG. 2 renders the spiral visualization using the display data from the item indicator generator 210, the spiral path calculator 220, the display analyzer 230, and/or the spiral visualization renderer 240. In examples herein, the spiral visualization renderer 240 may instruct a display device to render the visualization based on the display data. For example, the spiral visualization renderer 240 may send signals to pixels (e.g., liquid crystals, light emitting diodes (LED), etc.) of a display device (e.g., a monitor, a television, a projector, etc.) causing the display device to present the spiral visualization. In examples herein, the spiral visualization renderer 240 may include or render characteristics of the visualization (e.g., labels, titles, etc.) based on user input or information determined from the dataset by the dataset receiver 120, the item indicator analyzer 210, etc.

In some examples, the spiral visualization renderer 240 of FIG. 2 may render animations corresponding to changes of spiral visualizations created in accordance with examples herein. For example, when a user selects a different characteristic corresponding to the items or order of the items of a spiral visualization to be displayed, the spiral visualization renderer 240 may render frames of an animation that transition from a first spiral visualization representative of an original characteristic to a second spiral visualization representative of a newly selected characteristic or sorted order. More specifically, each frame of the animation may transition the spiral visualization from an original frame of the spiral visualization indicating the dimensions of the item indicators for an original characteristic to a last frame of the spiral visualization that renders the item indicators with new dimensions corresponding to a new characteristic. Furthermore, the spiral visualization renderer 240 frames of an animation corresponding to a reordering of items of the spiral visualization based on a sort request such that the series of frames of the animation may show the items transitioning from original locations on the spiral path to new locations of the spiral path based on the sorted order. In some examples, the spiral visualization renderer 240 may render frames of an animation of a spiral visualization where each frame of the animation corresponds to a rendered spiral visualization based on the items of a dataset at a particular point in time. As such, the spiral visualization generator 210 may monitor a dataset that is building from a stream of data and update the spiral visualization periodically (e.g., every second) or aperiodically (after each update or newly received data item or piece of data received by the dataset receiver 210). The spiral visualization renderer 240 may then animate the spiral visualization via frames showing each spiral visualization generated as the data is added to the dataset and, thus, provide a visual representation of the evolution of the dataset in an animated spiral visualization.

In some examples, when animating spiral visualizations herein, the spiral visualization renderer may coordinate with the item indicator 210, the spiral path calculator 220, and the display analyzer 230 to create a series of spiral visualizations to illustrate transitions from a first spiral visualization to a second spiral visualization. In an example animation from a first characteristic of the items to a second characteristic of the items, the animation may adjust frames of the animation such that a user may perceive a change in scale of the changed items. Accordingly, a series of spiral visualizations may be generated for frames to show a change in scale of the items and a change in the layout from a first spiral visualization to a second spiral visualization. For example, if a new spiral visualization is to appear smaller on a display, the spiral visualization generator 110 may maintain the scale of the item indicators by first animating a layout change to the spiral visualizations (i.e., moving the items from original locations to corresponding new locations on the spiral visualization frame by frame) and then adjusting the size of the item indicators and zooming into the spiral visualization new layout spiral visualization. On the other hand, if a new spiral visualization is to appear larger in a display area when switching from one characteristic to another, the spiral visualization renderer may zoom out from the spiral visualization and animate the change in the layout frame by frame from the original spiral visualization to a new spiral visualization.

In some examples, the spiral visualization generator 110 may generate spiral visualizations of spiral visualizations. In such an example, a spiral visualization for a characteristic may be illustrated as a spiral visualization item indicator (e.g. one of the item indicators 300 of FIG. 3). Accordingly, in such an example, each item indicator 300 would be an individual spiral visualization for a characteristic of the items. For example, the item indicator may generate the item indicators 300 to include spiral visualizations of a plurality of characteristics, such that each of the item indicators 300 includes a spiral visualization for each characteristic of the plurality of characteristics. To generate such a spiral visualization, examples herein may be iteratively executed to generate each spiral visualization for each item indicator. Then, a final iteration may be used to render a spiral visualization of the spiral visualizations. Accordingly, the spiral visualizations may each be presented as item indicators for particular characteristics. In some examples, each spiral visualization item indicator may correspond to a same characteristic but a different period of time. Accordingly, an example spiral visualization of spiral visualizations (e.g., a fractal like visualization of spirals within spirals) may illustrate multiple characteristics of items.

Accordingly, referring back to the customer service data example for a product manufacturer, the product manufacturer may generate a spiral visualization of its products to identify characteristics of the products relative to one another. For example, the product manufacturer may identify which products are the most profitable, which products receive the least amount of complaints, which products have the highest performance, and ultimately how the products are performing for the product manufacturer.

While an example manner of implementing the spiral visualization generator 110 of FIG. 1 is illustrated in FIG. 2, at least one of the elements, processes and/or devices illustrated in FIG. 2 may be combined, divided, re-arranged, omitted, eliminated and/or implemented in any other way. Further, the item indicator generator 210, the spiral path calculator 220, the display analyzer 230, the spiral visualization renderer 240 and/or, more generally, the example spiral visualization generator 110 of FIG. 2 may be implemented by hardware and/or any combination of hardware and executable instructions (e.g., software and/or firmware). Thus, for example, any of the item indicator generator 210, the spiral path calculator 220, the display analyzer 230, the spiral visualization renderer 240 and/or, more generally, the example spiral visualization generator 110 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the item indicator generator 210, the spiral path calculator 220, the display analyzer 230, or the spiral visualization renderer 240 is/are hereby expressly defined to include a tangible machine readable storage device or storage disk such as a memory, a digital versatile disk (DVD), a compact disk (CD), a Blu-ray disk, etc. storing the executable instructions. Further still, the example spiral visualization generator 110 of FIG. 2 may include at least one element, process, and/or device in addition to, or instead of, those illustrated in FIG. 2, and/or may include more than one of any or all of the illustrated elements, processes and devices.

FIGS. 4A-4E illustrate example variations of spiral visualizations that may be generated by the spiral visualization generator 110 of FIGS. 1 and/or 2 in accordance with examples herein. The spiral visualizations in the examples of FIGS. 4A-4E based on characteristics of the item indicators. Each of the examples in FIGS. 4A-4E, spiral visualizations 400A-400E, respectively, are illustrated in example display areas 410A-410E, respectively.

Figure 4A:
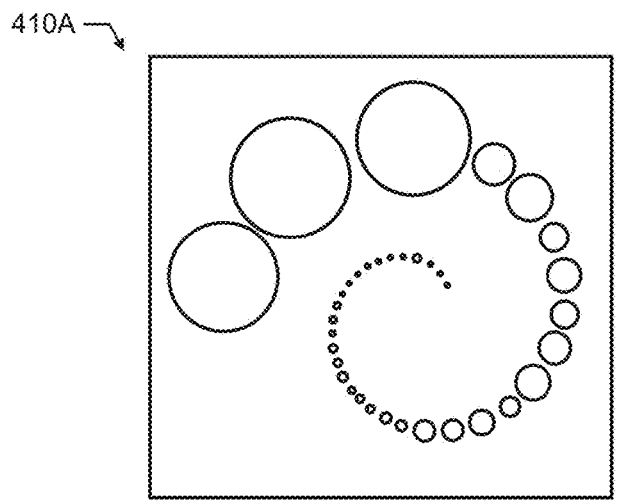
FIGS. 4A-4E, 5, and 6 illustrate example spiral visualizations that may be generated by the spiral visualization generator of FIG. 2.

The spiral visualization 400A of FIG. 4A presents unsorted item indicators in the display area 410. In FIG. 4A, the item indicators are of various sizes (e.g., to represent different characteristic values for products for a product manufacturer). As described above, the spiral visualization generator 410 may calculate the hulls (as described in reference to FIG. 3D) for boundaries of the spiral path and render the spiral visualization 400A accordingly. Based on the number and dimensions of item indicators, and an average size of the item indicators, the spiral path calculator 220 may determine that a single turn for a spiral path is adequate for the spiral visualization 400A.

Figure 4B:
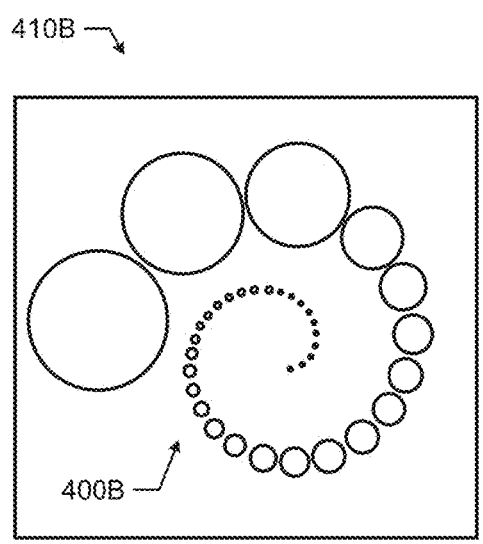
Figure 4C:
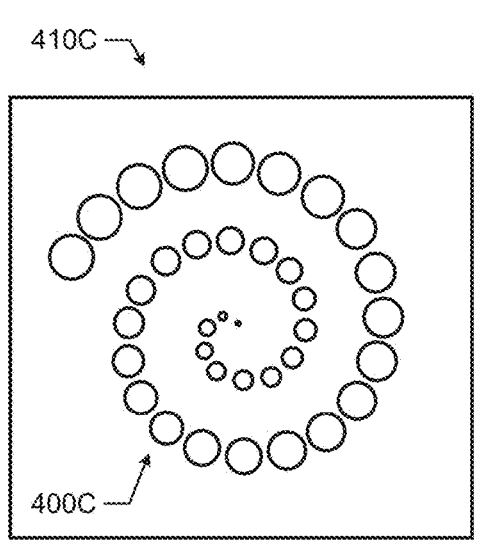

The spiral visualizations 400B, 400C of FIGS. 4B, 4C, respectively, illustrate sorted items in a decreasing order relative to the size of the item indicators. The spiral visualization 400B of FIG. 4B has less than two turns and the spiral visualization 400C has more than two turns. The spiral path calculator 220 may determine the number of turns for the spiral path visualizations 400B, 400C based on the number of item indicators, the average size of the item indicators, and standard deviation of the sizes of the item indicators. The item indicators of the spiral visualization 400B, 400C illustrate item indicators in a sorted order (e.g., sorted by the dataset receiver 120 of FIG. 1) from largest to smallest (i.e., from starting coordinates toward respective center points of the spiral visualizations 400B, 400C).

Figure 4D:
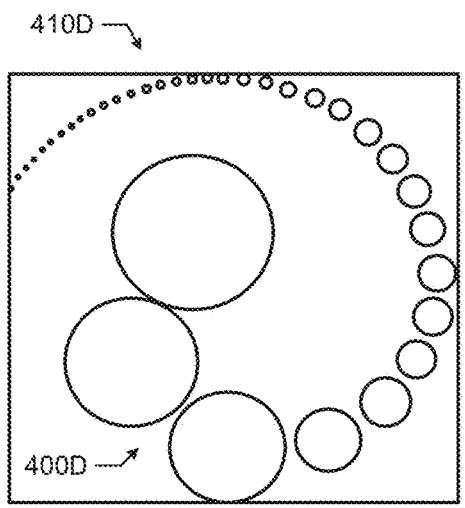
Figure 4E:
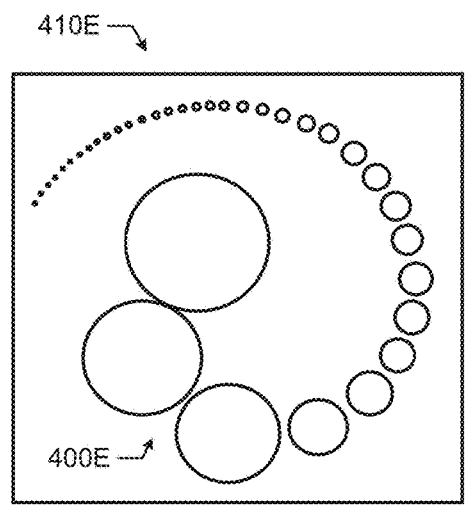

The spiral visualizations 400D, 400E of FIGS. 4D, 4E, respectively, illustrate an adjustment in the size of the item indicators of the spiral visualizations 400D, 400E. Accordingly, the spiral visualizations 400D, 400E may represents plots of item indicators representative of the same items of a dataset. Upon plotting the item indicators in FIG. 4D, the display analyzer 230 may determine that the calculated spiral path and/or size of the item indicators is too large. As such, the item indicator generator 210 may scale down the item indicators to generate the item indicators of the spiral visualization 400E. Accordingly, as shown, the spiral visualization 400D exceeds margins (e.g., a threshold number of pixels) of the display are 410D, while the spiral visualization 400E of FIG. 4E fits within margins of the display area 410E.

Furthermore, the spiral visualizations 400D, 400E of FIGS. 4D, 4E illustrate sorted items in an increasing order relative to the size of the item indicators. In these examples, the spiral path calculator 210 may generate a spiral path that creates a large central area to enable the larger item indicators to have room toward the center point of the spiral visualizations 400D, 400E. Accordingly, the spiral path calculator 220 may determine the tightness of turns based on the order of the item indicators, the sizes of the item indicators, the average size of the item indicators and the standard deviations in the sizes of the item indicators.

Figure 5:
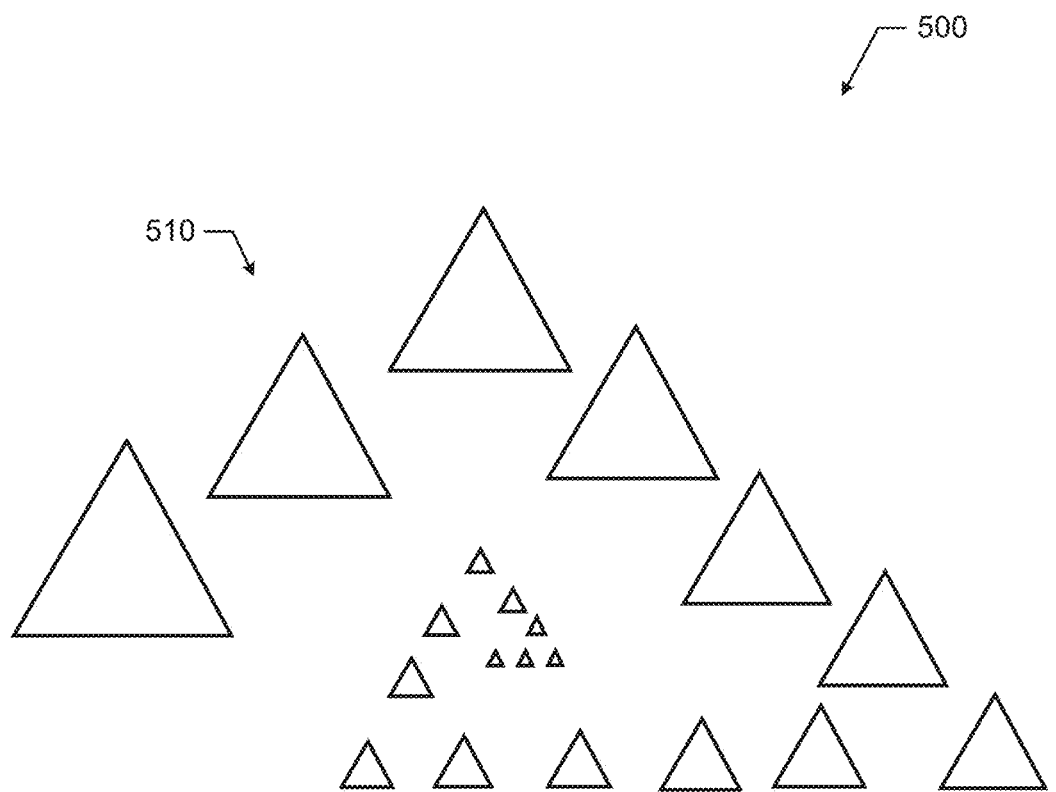

FIG. 5 illustrates an example spiral visualization generated in accordance with examples herein having a polygonal shape. The example polygonal shape of FIG. 5 is a triangular shape corresponding to the shapes of item indicators 510 of the spiral visualization. In calculating the example spiral path calculator 220 may calculate a polygonal shaped spiral in a similar manner as illustrated with respect to FIGS. 3A-3D, using a spiral path shape template. The tightness and number of turns for the spiral visualization 500 of FIG. 5 may depend on the number of item indicators 510, the size of the item indicators 510, and a size of a display area presenting the spiral visualization 500.

Figure 6:
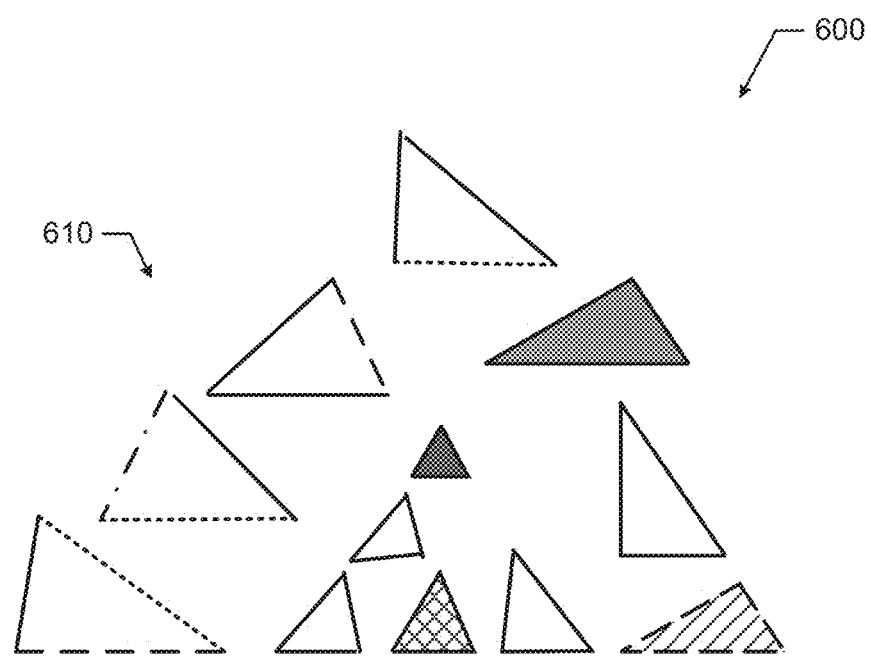

FIG. 6 illustrates an example spiral visualization 600 with multi-dimensional item indicators that may have been generated by the item indicator generator 210. In the illustrated example of FIG. 6, the item indicator generator 210 generates triangles for each item of a dataset to illustrate at least three characteristics of each item in each item indicator. The example lengths of each edge of the triangles may correspond to a certain value (e.g., size) of each the characteristics, thus creating various sized and shaped triangles. In some examples, the edge colors, patterns, etc. may further be adjusted (e.g., dotted, dashed, solid, thick, thin, etc.) to indicate further values for the three characteristics of each item. In some examples, a fill of the item indicator (e.g., pattern, color, chrominance, etc.) may be adjusted to indicate a characteristic of the item. Accordingly, the item indicator generator 210 may generate multi-dimensional item indicators 610 to visually represent various amounts of data corresponding to the items of the spiral visualization. In some examples, the spiral visualization renderer may additionally render a legend corresponding to the various characteristics of the items to illustrate what each feature of the item represents.

Figure 7:
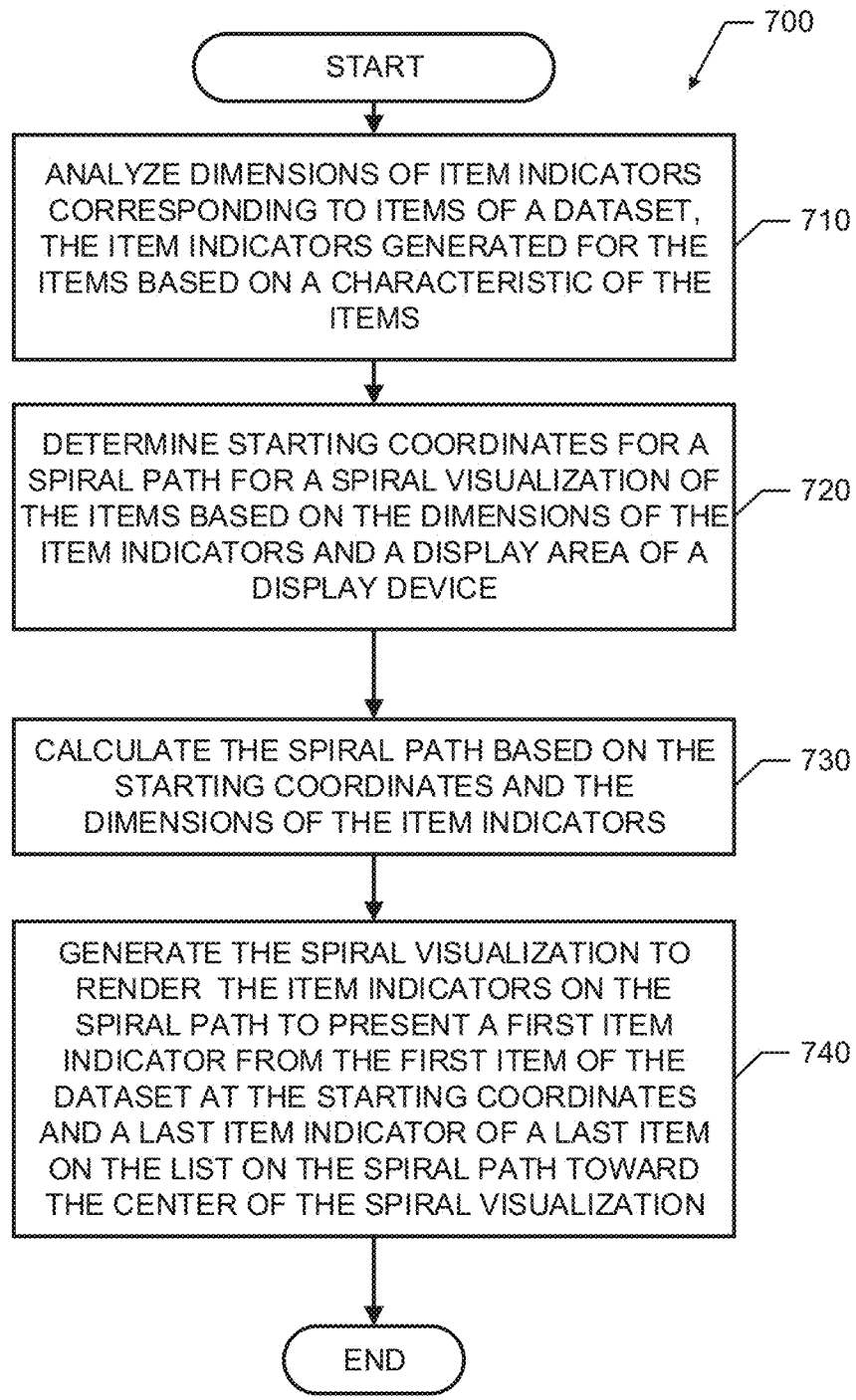
FIG. 7 is a flowchart representative of example machine readable instructions that may be executed to implement the spiral visualization generator of FIG. 2.
Figure 8:
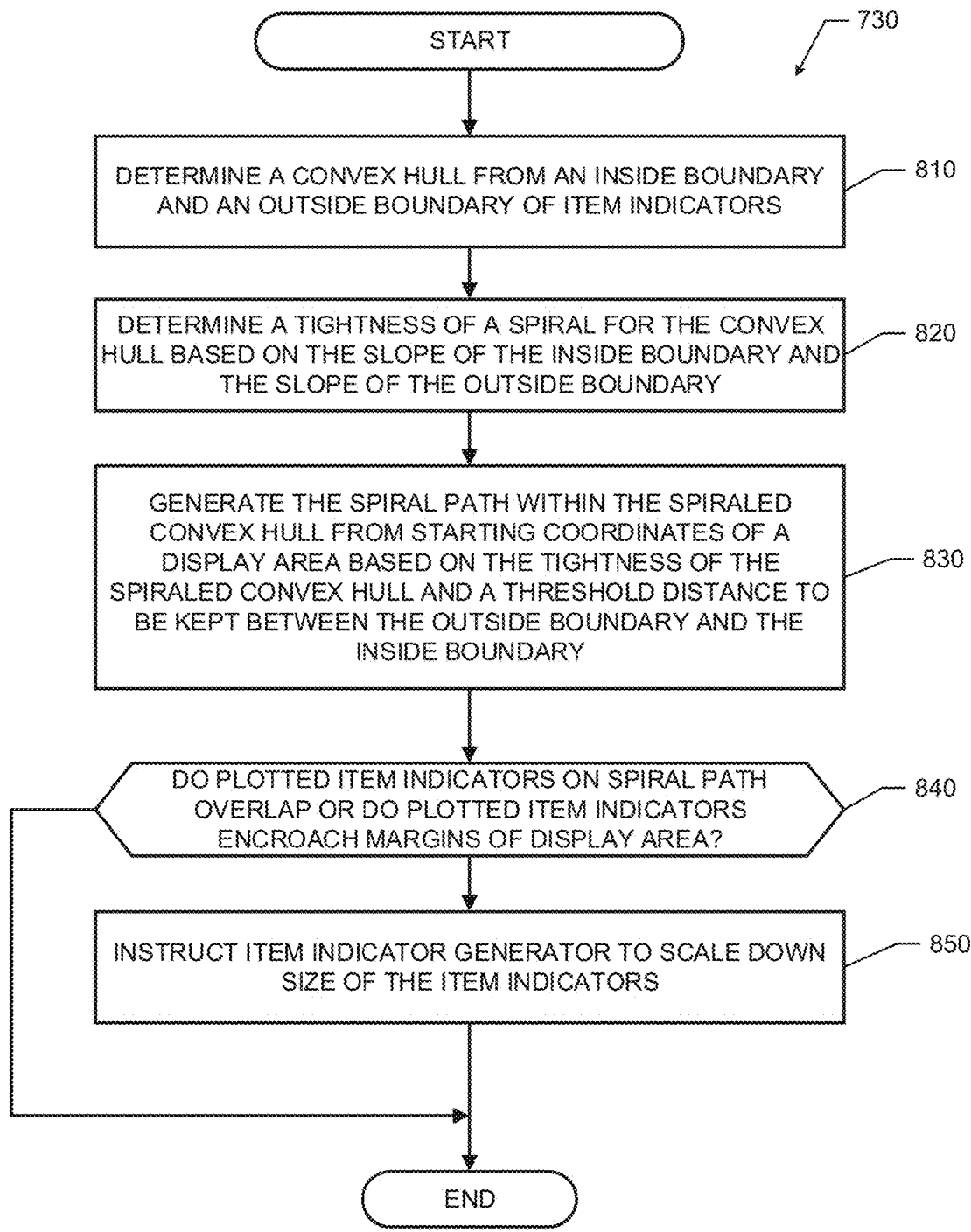
FIG. 8 is a flowchart representative of an example portion of the example machine readable instructions of FIG. 7 to implement the spiral visualization generator of FIG. 2.

Flowcharts representative of example machine readable instructions for implementing the spiral visualization generator 110 of FIG. 2 are shown in FIGS. 7 and 8. In these examples, the machine readable instructions comprise a program(s)/process(es) for execution by a processor such as the processor 912 shown in the example processor platform 900 discussed below in connection with FIG. 9. The program(s)/process(es) may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 912, but the entire program/process and/or parts thereof could alternatively be executed by a device other than the processor 912 and/or embodied in firmware or dedicated hardware. Further, although the example program(s)/process(es) is/are described with reference to the flowcharts illustrated in FIGS. 7 and 8, many other methods of implementing the example spiral visualization generator 110 may alternatively be used. For example, the order of execution of the blocks may be changed, and/or some of the blocks described may be changed, eliminated, or combined.

The example process 700 of FIG. 7 begins with an initiation of the spiral visualization generator 110 (e.g., upon startup, upon instructions from a user, upon startup of a device implementing the code enabled media generator 110 (e.g., the spiral visualization system 100), etc.). The example process 700 may be executed to generate a spiral visualization. At block 710, the spiral path calculator 220 analyzes dimensions of item indicators corresponding to items of a dataset. The examples item indicators may be generated by the item indicator generator 210. At block 720, the spiral path calculator 220 determines starting coordinates for a spiral path for a spiral visualization of the items based on the dimensions of the item indicators and a display area of a display device.

At block 730 of FIG. 7, the spiral path calculator 220 calculates the spiral path based on the starting coordinates and the dimensions of the item indicators. At block 740, the spiral visualization renderer 240 generates the spiral visualization to render the item indicators on the spiral path to present a first item indicator from the first item of the dataset at the starting coordinates and a last item indicator of a last item on the list on the spiral path toward the center of the spiral visualization.

The example process 800 of FIG. 8 begins with an initiation of the spiral visualization generator 110. The example process 800 of FIG. 8 may be executed to implement block 730 of FIG. 7 to calculate a spiral path for a spiral visualization. At block 810, the spiral path calculator 220 determines a convex hull from an inside boundary and an outside boundary of item indicators. At block 820, the spiral path calculator 220 determines a tightness of a spiral for the convex hull based on the slope of the inside boundary and the slope of the outside boundary. At block 830, the display analyzer 230 generates the spiral path within the spiraled convex hull from starting coordinates of a display area based on the tightness of the spiraled convex hull and a threshold distance to be kept between the outside boundary and the inside boundary.

At block 840, the display analyzer 230 determines whether the plotted indicators on the spiral path overlap or whether plotted item indicators encroach margins of display area. If, at block 840, the plotted item indicators on the spiral path do overlap or do encroach the margins of the display area (e.g., within a threshold number of pixels), then, at block 850, the display analyzer 230 instructs the item indicator generator 210 to scale down the size of the item indicators. After block 850, the new spiral path may be recalculated with the scaled down item indicators. If, at block 840, the plotted item indicators on the spiral path do not overlap and do not encroach the margins of the display area (e.g., within a threshold number of pixels), then the example process 800 ends and the spiral visualization may be generated/rendered on the display device (e.g., see block 740).

As mentioned above, the example processes of FIGS. 7 and 8 may be implemented using coded instructions (e.g., computer and/or machine readable instructions) stored on a tangible machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 7 and 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media. As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 9:
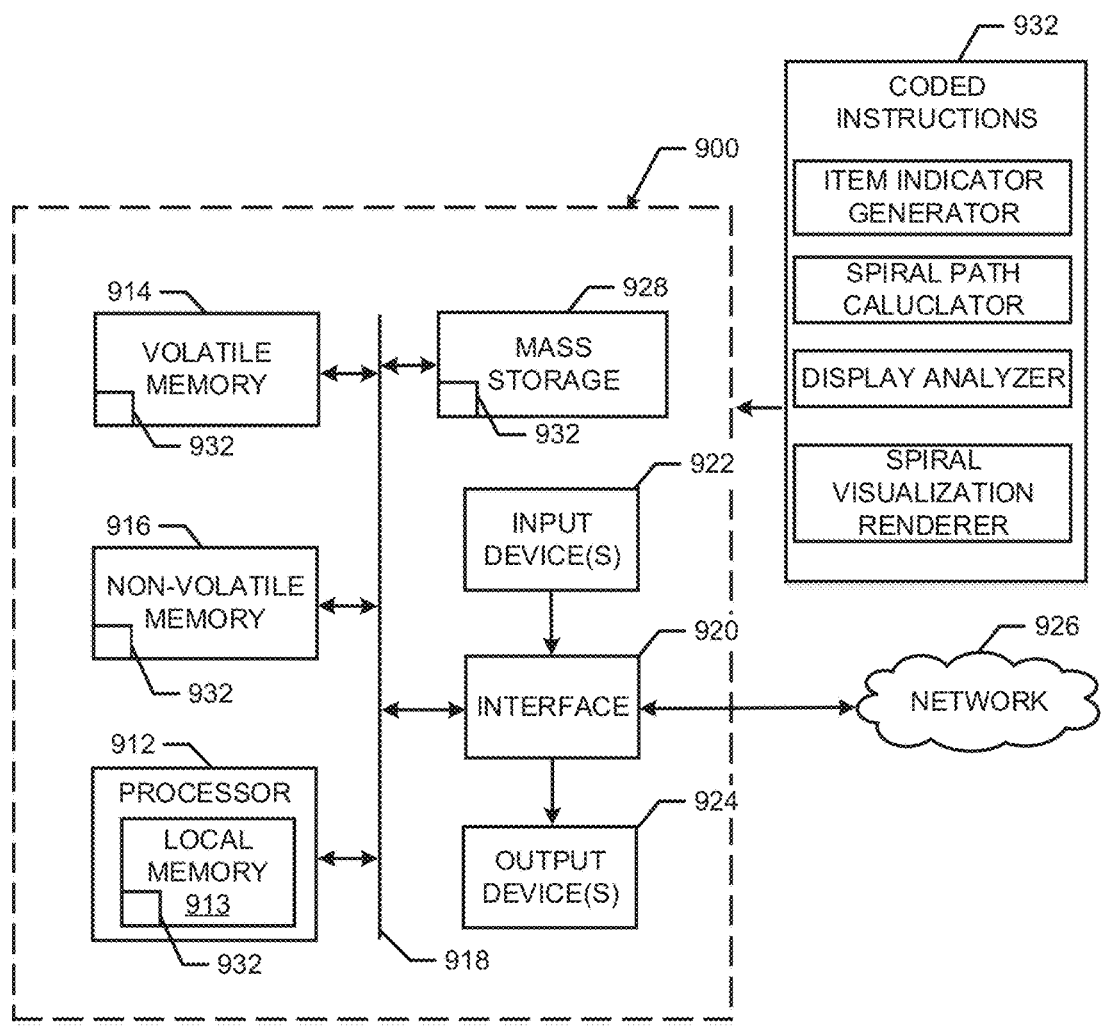
FIG. 9 is a block diagram of an example processor platform capable of executing the instructions of FIGS. 7 and/or 8 to implement the spiral visualization generator of FIG. 2.

FIG. 9 is a block diagram of an example processor platform 900 capable of executing the instructions of FIGS. 7 and 8 to implement the spiral visualization generator 110 of FIG. 2. The example processor platform 900 may be or may be included in any type of apparatus, such as a server, a personal computer, a mobile device (e.g., a cell phone, a smart phone, a tablet, etc.), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example of FIG. 9 includes a processor 912. The processor 912 of the illustrated example is hardware. For example, the processor 912 can be implemented by at least one integrated circuit, logic circuit, microprocessor or controller from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory, a persistent, byte-addressable memory accessible via a memory fabric and/or any other desired type of non-volatile memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a peripheral component interconnect (PCI) express interface.

In the illustrated example, at least one input device 922 is connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 924 is also connected to the interface circuit 920 of the illustrated example. The output device(s) 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, may include a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes at least one mass storage device 928 for storing executable instructions (e.g., software) and/or data. Examples of such mass storage device(s) 928 include floppy disk drives, hard drive disks, compact disk drives, Blu-ray disk drives, RAID systems, and digital versatile disk (DVD) drives.

The coded instructions 932 of FIGS. 7 and/or 8 may be stored in the mass storage device 928, in the local memory 913 in the volatile memory 914, in the non-volatile memory 916, and/or on a removable tangible machine readable storage medium such as a CD or DVD.

From the foregoing, it will be appreciated that the above disclosed methods, apparatus and articles of manufacture generate a spiral visualization to visually illustrate characteristics of items in a dataset. In examples herein, a spiral visualization may be automatically rendered from just a list of items and corresponding characteristics without user interaction or user interference. However, user interaction may be involved to customize settings for generation of the spiral visualization. Examples herein ensure that a spiral visualization is generated such that item indicators representative of items of the data set do not overlap and do not encroach on margins of the display area. Furthermore, examples herein allow for animation of spiral visualizations to illustrate changes to the characteristics or selected items of the dataset for the visualization.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method executed by a system comprising a hardware processor, comprising:
   analyzing dimensions of item indicators corresponding to items of a dataset, the item indicators generated for the items based on a characteristic of the items;
   determining starting coordinates for a spiral path for a spiral visualization of the items based on the dimensions of the item indicators and a display area of a display device, the starting coordinates comprising coordinates of the display area;
   calculating a convex hull for the spiral path by calculating an outside boundary and an inside boundary for the spiral path based on the dimensions and an order of the item indicators along the spiral path, the spiral path to be located within the convex hull;
   calculating the spiral path based on the starting coordinates and the dimensions of the item indicators, wherein calculating the spiral path comprises spiraling the convex hull such that a threshold distance is maintained between the inside boundary and the outside boundary between turns of the spiral visualization; and
   generating the spiral visualization to render the item indicators on the spiral path to present a first item indicator of the item indicators corresponding to a first item of the dataset at the starting coordinates and a last item indicator of the item indicators corresponding to a last item of the dataset on the spiral path toward a center of the spiral visualization.

2. The method of claim 1, further comprising:
   determining that borders of the item indicators are within a threshold outside margin of a display area presenting the spiral visualization; and
   scaling down the dimensions of the item indicators such that the item indicators are not within the threshold outside margin of the display area.

3. The method of claim 1, further comprising:
   determining that an area of the item indicators is less than a threshold percentage of a display area presenting the spiral visualization; and
   scaling up the dimensions of the item indicators such that the area of the item indicators is equal to or greater than the threshold percentage of the display area presenting the spiral visualization.

4. The method of claim 1, further comprising:
   sorting the items of the dataset based on the characteristic of the items in an increasing order or decreasing order.

5. The method of claim 1, further comprising generating the item indicators based on respective values of the characteristic of the items.

6. The method of claim 1, further comprising generating the item indicators based on a plurality of characteristics including the characteristic, the plurality of characteristics represented by lengths of edges of the item indicators.

7. The method of claim 6, wherein the item indicators each has a polygonal shape to show the plurality of characteristics, wherein each edge of the polygonal shape corresponds to one of the plurality of characteristics.

8. The method of claim 1, further comprising:
   determining a shape of the item indicators; and
   generating the spiral path to have a shape based on the shape of the item indicators.

9. The method of claim 1, further comprising animating the spiral visualization by rendering frames of the spiral visualization to show a change in selection of the characteristic from an original characteristic to a new characteristic of the items, each frame transitioning the spiral visualization from an original frame of the spiral visualization indicating the dimensions of the item indicators for the original characteristic to a last frame of the spiral visualization that renders the item indicators with new dimensions corresponding to the new characteristic.

10. The method of claim 9, further comprising:
    determining whether a new spiral visualization for the new characteristic is to appear larger or smaller than an original spiral visualization for the original characteristic;
    if the new spiral visualization is to appear smaller than the original spiral visualization, animating a layout change from the original spiral visualization to the new spiral visualization frame by frame and then zooming in toward the new spiral visualization frame by frame; and
    if the new spiral visualization is to appear larger than the original spiral visualization, zooming out from the original spiral visualization frame by frame, then animating the layout change from the original spiral visualization to the new spiral visualization frame by frame.

11. A system comprising:
    a processor; and
    a non-transitory storage medium storing instructions executable on the processor to:
      generate item indicators corresponding to items of a dataset, the item indicators to include spiral visualizations of a plurality of characteristics, such that each of the item indicators comprises a spiral visualization for each characteristic of the plurality of characteristics;
      analyze dimensions of the item indicators corresponding to the items of the dataset;
      determine starting coordinates for a spiral path for a spiral visualization of the items based on the dimensions of the item indicators and a display area of a display device, the starting coordinates comprising coordinates of the display area;
      calculate the spiral path based on the starting coordinates and the dimensions of the item indicators; and
      generate the spiral visualization to render the item indicators on the spiral path to present a first item indicator of the item indicators corresponding to a first item of the dataset at the starting coordinates and a last item indicator of the item indicators corresponding to a last item of the dataset on the spiral path toward a center of the spiral visualization.

12. The system of claim 11, wherein the instructions are executable on the processor to:
    confirm that the item indicators presented in the spiral visualization do not overlap and are within threshold margins of the display area.

13. The system of claim 11, wherein the instructions are executable on the processor to:
    determine the starting coordinates further based on a user input.

14. The system of claim 11, wherein the instructions are executable on the processor to:

calculate a convex hull from inside and outside boundaries of the item indicators when lined up in a straight line, spiral the convex hull to determine the spiral path such that the outside boundary is at least a threshold distance from the inside boundary between turns of the spiral path, the spiral path located between the inside and outside boundaries of the spiraled convex hull.

15. A non-transitory machine readable medium comprising instructions that, when executed, cause a machine to:

calculate a spiral path for a spiral visualization by:

determining a convex hull from an inside boundary and an outside boundary of item indicators to be presented in the spiral visualization based on dimensions of the item indicators, the item indicators representative of characteristics of items of a dataset, determining a tightness of a spiral for the convex hull based on a slope of the inside boundary and a slope of the outside boundary, generating the spiral path within the spiraled convex hull from starting coordinates of a display area based on the tightness of the spiral and a threshold distance to be kept between the outside boundary and the inside boundary between turns of the spiral, determining whether the item indicators plotted on the spiral path overlap and whether the item indicators encroach margins of the display area; and in response to determining that the item indicators do not overlap and do not encroach the margins of the display area, render the spiral visualization by presenting the item indicators along the calculated spiral path to visually present the characteristics of the items of the dataset.

16. The non-transitory machine readable medium of claim 15, wherein the instructions, when executed, further cause the machine to:

in response to determining that the item indicators do overlap or do encroach the margins of the display area:
scale down the dimensions of the item indicators, and
calculate a second spiral path for the spiral visualization using the scaled down dimensions of the item indicators.

17. The non-transitory machine readable medium of claim 15, wherein the instructions, when executed, further cause the machine to:

determine the inside boundary and the outside boundary by:
lining the item indicators in a straight line,
setting the outside boundary to a tangential line running along at least two of the item indicators on an outside side of the spiral path of the item indicators in the straight line, and
setting the inside boundary to a tangential line running along at least two of the item indicators on an inside side of the spiral path of the item indicators in the straight line.

18. The non-transitory machine readable medium of claim 15, wherein the instructions, when executed, further cause the machine to:

receive the dataset of items to be presented in the spiral visualization; and
sort the items of the dataset in a decreasing or increasing order based on a characteristic of the items.

19. The non-transitory machine readable medium of claim 15, wherein the instructions, when executed, further cause the machine to:

determine the slope of the inside boundary by determining a first slope of a first hull of the inside boundary and a second slope of a second hull of the inside boundary, the first hull of the inside boundary comprising a line that runs tangential to an outermost point of the item indicators toward a starting point of the spiral path and the second hull of the inside boundary comprising a line that runs tangential to the outermost point of the item indicators toward an ending point of the spiral path;

set the inside boundary to be a line having a slope that is between the slope of the first hull and the slope of the second hull;

determine the slope of the outside boundary by determining a first slope of a first hull of the outside boundary and a second slope of a second hull of the outside boundary, the first hull of the outside boundary comprising a line that runs tangential to an outermost point of the item indicators toward a starting point of the spiral path and the second hull of the outside boundary comprising a line that runs tangential to the outermost point of the item indicators toward an ending point of the spiral path;

set the outside boundary to be a line having a slope that is between the slope of the first hull and the slope of the second hull.

* * * * *